(12) United States Patent
Rudelic

(10) Patent No.: US 7,673,129 B2
(45) Date of Patent: Mar. 2, 2010

(54) SECURE BOOTING FROM A MEMORY DEVICE

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1159 days.

(21) Appl. No.: 11/237,306

(22) Filed: Sep. 27, 2005

(65) Prior Publication Data

US 2007/0073995 A1  Mar. 29, 2007

(51) Int. Cl.
  *G06F 12/14* (2006.01)
  *G06F 9/445* (2006.01)
(52) U.S. Cl. ............... 713/2; 711/202; 726/27
(58) Field of Classification Search ............... None
  See application file for complete search history.

(56) References Cited

U.S. PATENT DOCUMENTS 6,877,063 B1 * 4/2005 Allegrucci et al. ......... 711/102
7,082,509 B2 * 7/2006 Zimmer et al. ............. 711/170
7,360,073 B1 * 4/2008 Billstrom et al. ............... 713/2

OTHER PUBLICATIONS

Intel Corporation, "Intel Advanced+Boot Block Flash Memory (C3)", *Datasheet*, Order No. 290645, Revision: 023, May 2005, pp. 1-72.
US Patent Application filed Sep. 27, 2005, entitled "Logging Changes to Blocks in a Non-Volatile Memory", invented by J.C. Rudelic & S. Eilbert.

* cited by examiner

*Primary Examiner*—Gary J Portka
(74) *Attorney, Agent, or Firm*—Konrad Raynes & Victor LLP; David W. Victor

(57) ABSTRACT

Provided are a method, device, and system for booting from a memory device having an array of blocks of cells. An initial memory map has a mapping of memory addresses to accessible blocks of cells in the memory device that are accessible following a boot sequence. There are secure blocks of cells in addition to the accessible blocks of cells that are not accessible through the memory addresses in the initial memory map. In response to detecting an initialization event, the secure blocks of cells are mapped to a range of memory addresses in the memory map to generate an altered memory map. Code is executed in the secure blocks using the range of memory addresses in the altered memory map. The range of memory addresses mapping to the secure blocks are remapped to map to the accessible blocks to which the range of memory addresses mapped in the initial memory map to restore the initial memory map from the altered memory map.

26 Claims, 3 Drawing Sheets

SECURE BOOTING FROM A MEMORY DEVICE

BACKGROUND

In many devices, such as cell phones and other programmable electronic devices, the operating system and application code may be stored in a flash memory device and loaded into memory to initialize the runtime environment. Alternatively, for certain flash memory devices, such as a NOR flash, the code may be executed directly from the flash memory. Malicious code, known as malware, which includes viruses, worms, adware, etc., may attack core components of the operating system to compromise key applications, including critical applications that operate in the operating system kernel. One concern is that malicious code may be loaded into blocks in the flash memory device and then executed during operations of the programmable device.

Certain flash memory devices, such as the Intel Corporation Sibley flash device, may support Extended Flash Array (EFA) blocks, which are blocks in the flash memory that are not accessible in the initialized flash memory map. To access code or data from these blocks, a program must issue a command to map memory addresses in the memory map to the EFA blocks. After using the code or data from the EFA blocks, the memory addresses mapped to the EFA blocks may be mapped back to the blocks addressed in the initial mapping. In this way, the EFA blocks may be swapped in and out of memory during operations.

To ensure the integrity of the data and code maintained in the flash memory, the boot process may scan the content of each block in the flash memory to calculate a hash or checksum value to compare against a stored valid value to determine whether code or data has been modified. If the code in the blocks of the non-volatile memory device do not validate during initialization, then the boot sequence will fail and the electronic device may not go into operational mode until valid code is reinstalled in the flash memory.

DETAILED DESCRIPTION

Figure 1:
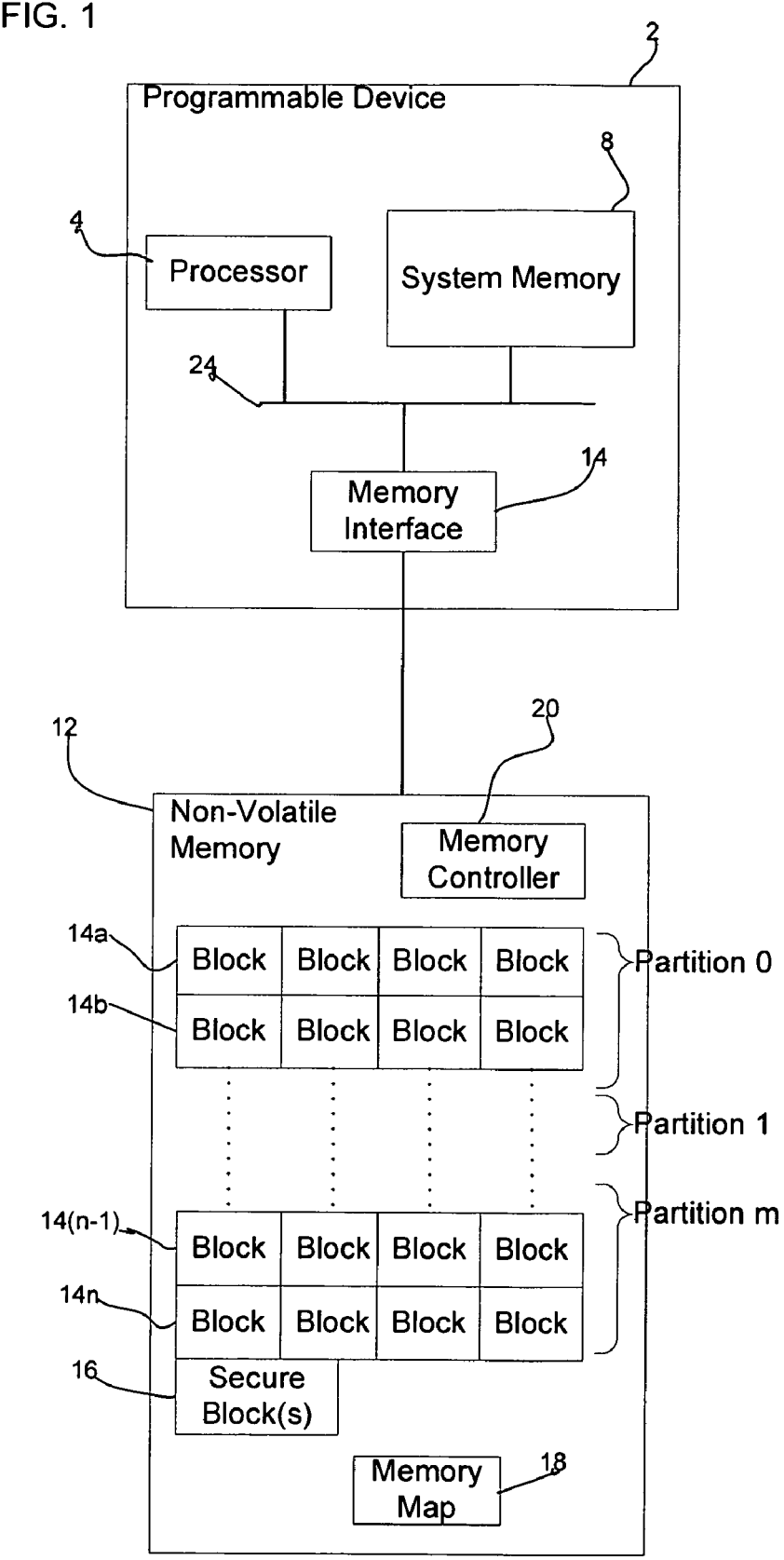
FIG. 1 illustrates an embodiment of a computing environment.

FIG. 1 illustrates a computing environment in which described embodiments are implemented. A programmable device 2 includes a processor 4 that stores data in a system memory 8 and is in communication with a non-volatile memory device 12. The non-volatile memory 12 may comprise a flash memory device having a plurality of cells. The cell maintains the charge, i.e., electrons, even when power is not supplied to the memory device 12. In NOR flash memories, the code may be executed directly from the memory device 12. In NAND flash memories, the code may be loaded from the NAND into the system memory 8 and the processor 4 executes the code from the system memory 8. The cells may be arranged in rows of blocks 14a, 14b ... 14n, where groups of blocks, such as rows of blocks, may be organized into multiple partitions 0 ... m. For instance, a 64 megabyte (Mb) flash memory may have eight partitions, wherein each partitions includes multiple blocks, where each block may have 128 kilobytes (Kb) of cells or individually accessible memory addresses. Each block 14a, 14b ... 14n comprises a plurality of cells in the memory device 12, where each cell provides non-volatile storage of an electric charge representing data.

In one embodiment, the code used by the programmable device 2 is stored in the accessible blocks 14a, 14b ... 14n in the non-volatile memory device 12. The non-volatile memory device 12 may further include secure blocks 16 that store boot code that the processor 4 executes to initialize the programmable device 2. In one embodiment, the processor 4 may execute operating system and application programs directly from the non-volatile memory 12. Alternatively, the processor 4 may load the operating system and applications into the memory 8 to execute. Alternatively, the boot code executed by the processor 4 may be maintained in a boot Read Only Memory (ROM) (not shown) in the programmable device 2. Additional portions of the boot sequence may also be maintained in and accessed from the accessible blocks 14a, 14b ... 14n.

A memory map 18 provides a mapping of memory addresses to accessible blocks 14a, 14b ... 14n. In the initial memory map 18 and the memory map 18 used after the boot sequence, the secure blocks 16 are not mapped in the range of addresses in the memory map 20 and thus not accessible to any operations or executing code during normal operations, but may be accessible following an initialization event, such as a power-on reset event. In certain Flash Memory devices, such as the Intel Sibley flash device, the secure blocks 16 may be implemented in an Extended Flash Array (EFA) blocks. However, in other flash memory devices, the secure blocks may be implemented in another secure location that is not accessible by default. The secure blocks 18 may include boot code that the processor 4 executes to initialize the programmable device 2 by validating configuration information in the programmable device 2 and memory 12, and loading operating system and application programs into the memory 8. In certain embodiments, the memory controller 20 may not implement any commands or interfaces that would allow a program to swap the secure blocks 16 into an accessible memory address range during normal runtime operations.

The programmable device 2 may comprise computational devices known in the art, such as a desktop computer, telephony device (cellular or mobile phone), personal digital assistant (PDA), workstation, server, mainframe, laptop, etc. The system memory 8 may comprise one or more volatile memory devices. The non-volatile memory device 12 may comprise certain non-volatile electronic memory devices known in the art, such as an Electrically-Erasable Programmable Read-Only Memory (EEPROM), including NAND and NOR flash memories, USB flash drive, an embedded flash memory device, etc. Alternatively, the non-volatile memory 12 may comprise a magnetic storage device. The non-volatile memory device 12 may be coupled to a physical interface 14 of the programmable device 2. In one embodiment, the non-volatile memory device 12 may be removably coupled to the interface 14, such that it may be readily removed and replaced with a different non-volatile memory device, such as for a different user. In certain embodiments, such as when the non-volatile memory device 12 comprises a NOR flash, the non-volatile memory 12 may be coupled directly to the bus 24 of the programmable device 2. The processor 4, system memory 8 and memory interface 14 may communicate via a bus 24 interface.

A memory controller 20 performs the write and erase operations with respect to the cells in the memory device 12. The memory controller 20 receives I/O requests via the memory interface 14. The memory interface 14 may include a data transfer protocol, such as a Flash Memory protocol, the Universal Serial Bus (USB) protocol or other data transfer protocols known in the art.

In FIG. 1, the memory controller 20 is shown implemented in the non-volatile memory 12 device, i.e., integrated circuit. In an alternative embodiment, the memory controller 20 may be implemented in the programmable device 2 with the memory interface 14 or implemented in both the programmable device 2 and in the non-volatile memory 12 device. In embodiments where the non-volatile memory 12 is coupled directly to the bus, the memory interface 14 is implemented in the non-volatile memory 12 unit.

Figure 2:
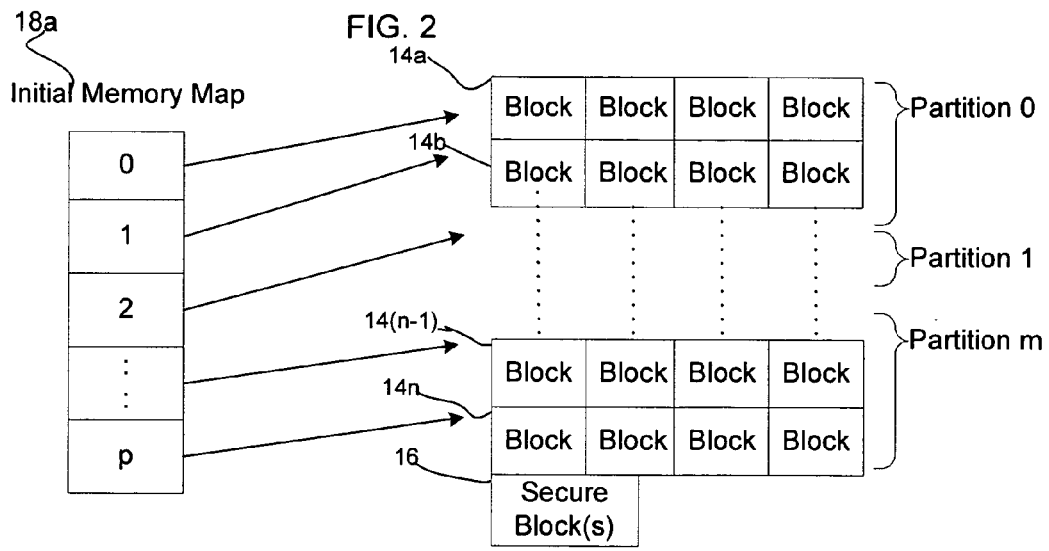
FIGS. 2 and 3 illustrate embodiments of memory mappings to blocks of cells in a memory device.

FIG. 2 illustrates an embodiment of an initial memory map 18a where the memory addresses 0 . . . p map to cells in the accessible blocks 14a, 14b . . . 14n, but not the secure blocks 16. The initial map 18a is also the mapping used during normal runtime operations following the boot sequence.

Figure 3:
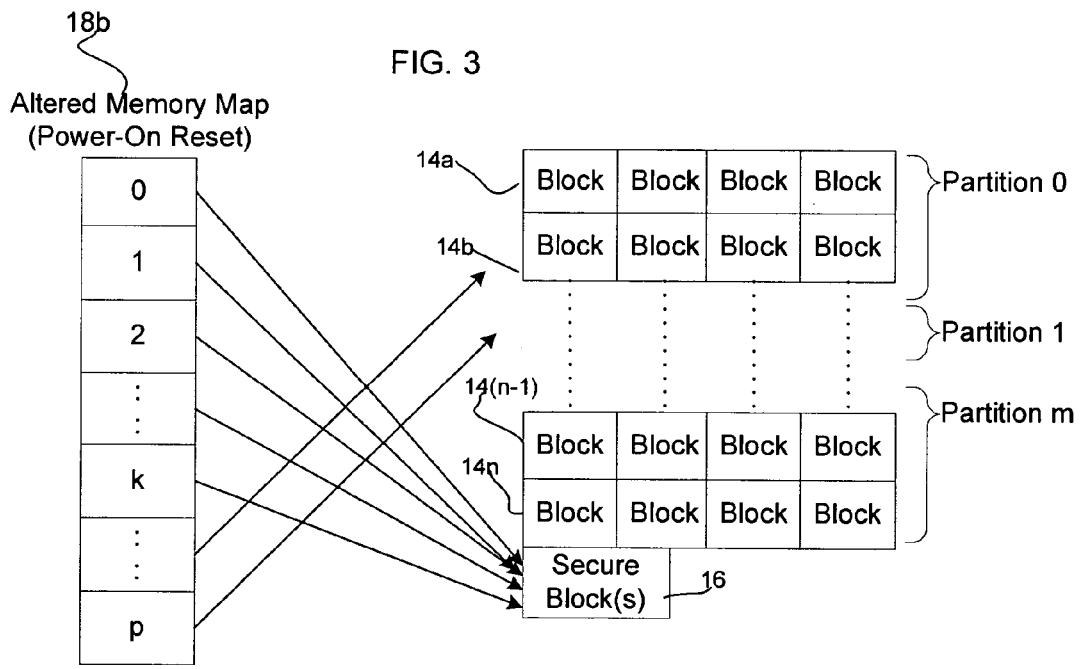

FIG. 3 illustrates an embodiment of an altered memory map 18b, where a first range of memory addresses 0 . . . k map to the cells in the secure blocks 16. The memory addresses (k+1) . . . p map to accessible blocks. In certain embodiments, the altered memory map 18b may be generated during an initialization event, such as a power-on reset event, to allow boot code in the secure blocks 16 to be executed during the initialization. After the execution of the boot code in the secure blocks 16 completes, the memory addresses 0 . . . k may be mapped back to the accessible blocks 14a, 14b . . . 14n to restore the initial memory map 18a for further boot sequence and runtime operations. In one embodiment, a first range of memory addresses 0 . . . k is mapped to the secure blocks 16 to produce the memory map 18b. In an alternative embodiment, a different range or non-consecutive ranges of memory addresses may be mapped to the secure blocks 16.

Figure 4:
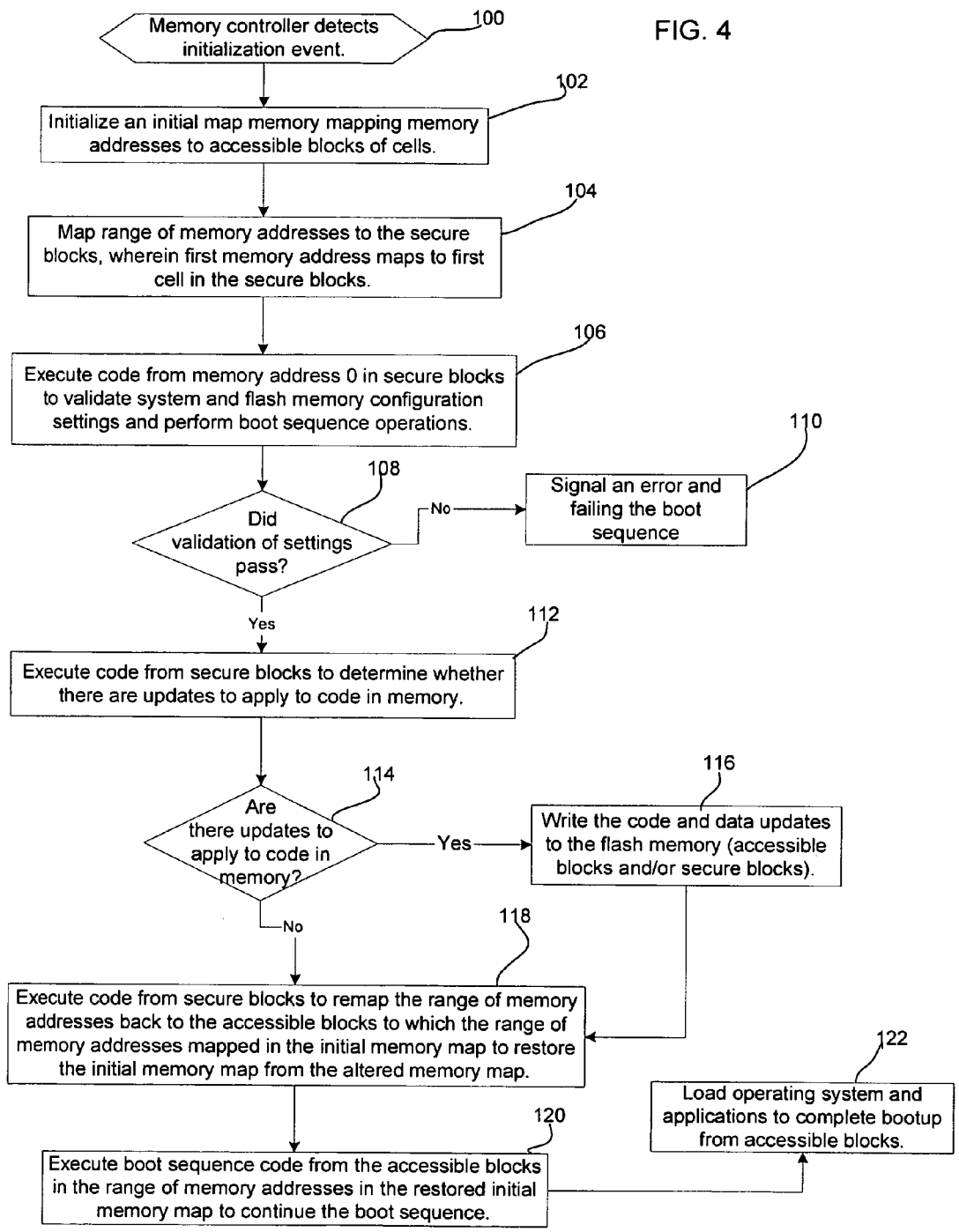
FIG. 4 illustrates an embodiment of operations performed by a memory controller to access and execute boot code in secure blocks in the memory device.

FIG. 4 illustrates an embodiment of operations performed by the memory controller 20 to perform boot operations in response to detecting an initialization event, such as a power-on reset, occurring in the programmable device 2. The operations of FIG. 4 may be implemented in code in firmware of the memory controller 20, in boot code in the secure blocks 16, and in accessible blocks 14a, 14b . . . 14n. In response to detecting (at block 100) the initialization event, e.g., power-on reset, the memory controller 20 initializes (at block 102) an initial memory map 18b (FIG. 2) mapping memory addresses 0 . . . p to accessible blocks 14a, 14b . . . 14n. The memory controller 20 then maps (at block 104) a range of memory addresses 0 . . . k, such as in the first partition 0; to the secure blocks 16. In one embodiment a first memory address 0, i.e., the boot address, may map to a first cell of the secure blocks 16. The memory controller 20 then executes (at block 106) code from memory address 0 (the boot address) in the secure blocks 16 to validate system and flash memory configuration settings and perform boot sequence operations. The code for operations 102, 104, and 106 may be implemented in firmware of the memory controller 20. The validation operations may validate configuration settings in the programmable device 2 as well as in blocks in the non-volatile memory 12, including accessible blocks 14a, 14b . . . 14n and the secure blocks 16.

If (at block 108) the validation of the configuration settings did not pass, then the memory controller 20 may signal (at block 110) an error, which could cause the failure of the boot sequence. Otherwise, if (at block 110) the validation passed, then the memory controller 20 may execute (at block 112) code from the secure blocks 16 to determine whether there are updates to apply to code in the memory device 12, such as in the secure blocks 16 and/or accessible blocks 14a, 14b . . . 14n. If (at block 114) there are updates to apply, then the memory controller 20 writes (at block 116) the code and data updates to the non-volatile memory device 12 (accessible blocks and/or secure blocks). In one embodiment, the boot sequence in the secure blocks 16 may connect to a network to determine whether there are any updates at a secure and trusted site to apply to the programmable device 2, such as updates to an operating system and applications.

After applying any updates (at block 116) or if there are no updates to apply (from the no branch at block 114), the memory controller 20 remaps (at block 118) the range of memory addresses 0 . . . k back to the accessible blocks to which the range of memory addresses mapped in the initial memory map 18a to restore the initial memory map 18 from the altered memory map 18b. In one embodiment, the memory controller 20 may perform the remapping operation of block 118 in response to executing remapping boot code in the secure blocks 16 or, alternatively, executing code in the firmware of the memory controller 20. In certain embodiments, the memory controller 20 may further execute (at block 120) boot sequence code from the accessible blocks 14a, 14b . . . 14n in the range of memory addresses in the restored initial memory map 18a to continue the boot sequence. In this way, the boot sequence may be implemented in boot code in the secure blocks 16 and in the accessible blocks addressed in the initial memory map 18a. The continued boot sequence may load (at block 122) an operating system and applications to the system memory 8 to complete the boot sequence. However, as discussed, in certain non-volatile memory devices, the operating system and applications may not be loaded into the system memory 8, but may instead be executed directly from the non-volatile memory 12.

With described embodiments, the boot sequence may start in response to an initialization event, such as a power reset, from secure blocks in the memory device that are inaccessible during runtime operations by executing code. These secure blocks are only accessible during the system initialization, e.g., power-on sequence, a time during which other malicious programs cannot change blocks of data or add viruses. Further, the boot code executed from the secure blocks may also validate configuration settings, including code and data in the programmable device 2 and the non-volatile memory device 12, to ensure that malicious code has not been added. After the boot code in the secure blocks is executed, the memory map is again altered to change addresses mapping to the secure blocks to map to the accessible blocks 14a, 14b . . . 14n. In this way, the secure blocks cannot be modified during runtime operations because the memory map does not provide an address range for the secure blocks. Further, the memory controller 20 may not implement any command or interface that allows the swapping of the secure blocks 16 into a range of memory addresses. Updates and modifications may only apply during the reset on sequence.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. Of course, those skilled in the art will recognize that many modifications may be made to this configuration without departing from the scope of the present invention, and that the article of manufacture may comprise suitable information bearing medium known in the art.

The described operations may be performed by circuitry, where "circuitry" refers to either hardware or software or a combination thereof. The circuitry for performing the operations of the described embodiments may be implemented as hardware logic, such as an integrated circuit chip, Programmable Gate Array (PGA), Application Specific Integrated Circuit (ASIC), etc. The circuitry may also comprise a processor component, such as an integrated circuit, and code in a computer readable medium, wherein the code is executed by the processor to perform the operations of the described embodiments.

In described embodiments, the security bits were maintained for blocks in a non-volatile memory device, such as an EEPROM or flash memory device. In an additional embodiment, the security bits may be used to indicate modified blocks in a volatile memory device in a system, such that data in the modified blocks in the volatile memory device may be validated. Further, the security bits may be used for electric non-volatile memory devices or other types of non-volatile memory to which data may be written multiple times, such as magnetic storage, writable optical storage, etc. In non-electronic memory devices, the cells may be implemented as magnetic charges, optical markings, etc.

The variables "k", "m", "n", and "p" are used to denote integer instances of elements, and may indicate different or the same integer value when used with different references to the elements. For instance, memory address "p", rows of blocks "n" may indicate a same or different number of these components.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

detecting an initialization event;

generating an initial memory map in response to the initialization event for a memory device including an array of blocks of cells, wherein the initial memory map has a mapping of memory addresses to accessible blocks of cells in the memory device that are accessible following a boot sequence, and wherein there are secure blocks of cells in addition to the accessible blocks of cells that are not accessible through the memory addresses in the initial memory map;

mapping a range of memory addresses in the initial memory map to the secure blocks of cells to generate an altered memory map;

executing code in the secure blocks using the range of memory addresses in the altered memory map;

remapping the range of memory addresses mapping to the secure blocks in the altered memory map to map to the accessible blocks to which the range of memory addresses mapped in the initial memory map to restore the initial memory map from the altered memory map; and executing code in the accessible blocks to complete the boot sequence and loading an operating system and applications from the accessible blocks in response to remapping the range of memory addresses.

2. The method of claim 1, wherein the secure blocks are not accessible to any operations after the remapping, and wherein the accessible blocks addressed by the range of memory addresses in the initial memory map are not accessible through the altered memory map during initialization event operations.

3. The method of claim 1, further comprising:
executing code in the secure blocks using the memory addresses in the altered memory map to validate configuration information, wherein the remapping of the range of memory addresses to restore the initial memory map is performed in response to validating the configuration information.

4. The method of claim 3, further comprising:
signaling an error in response to determining that the configuration information did not validate.

5. The method of claim 3, wherein the configuration information comprises at least one of hardware and software settings in a system in which the memory device is embedded, code in the secure blocks, and code in the accessible blocks.

6. The method of claim 1, further comprising:
executing code in the secure blocks using the range of memory addresses in the altered memory map to receive an update to the memory device; and
applying the update to blocks in the memory device.

7. The method of claim 1, wherein the memory device comprises an EEPROM, wherein the initialization event comprises a power-on reset, and a memory controller performs the power-on reset operations in response to detecting a power cycle event.

8. The method of claim 1, wherein the range of memory addresses mapping to the secure blocks in the altered memory map includes a boot address, wherein execution of the code in the secure blocks starts from the boot address.

9. A device, comprising:
a memory including an array of blocks of cells; and
circuitry configured to perform operations, the operations comprising:
detecting an initialization event;
generating an initial memory map in response to the initialization event having a mapping of memory addresses to accessible blocks of cells in the memory that are accessible following a boot sequence, and wherein there are secure blocks of cells in addition to the accessible blocks of cells that are not accessible through the memory addresses in the initial memory map;

mapping a range of memory addresses in the initial memory map to the secure blocks of cells to generate an altered memory map;

executing code in the secure blocks using the range of memory addresses in the altered memory map;

remapping the range of memory addresses mapping to the secure blocks in the altered memory map to map to the accessible blocks to which the range of memory addresses mapped in the initial memory map to restore the initial memory map from the altered memory map; and executing code in the accessible blocks to complete the boot sequence and loading an operating system and applications from the accessible blocks in response to remapping the range of memory addresses.

10. The device of claim 9, wherein the secure blocks are not accessible to any operations after the remapping, and wherein the accessible blocks addressed by the range of memory addresses in the initial memory map are not accessible through the altered memory map during initialization event operations.

11. The device of claim 9, wherein the operations further comprise:
executing code in the secure blocks using the memory addresses in the altered memory map to validate configuration information, wherein the remapping of the range of memory addresses to restore the initial memory map is performed in response to validating the configuration information.

12. The device of claim 11, wherein the operations further comprise:
signaling an error in response to determining that the configuration information did not validate.

13. The device of claim 11, wherein the configuration information comprises at least one of hardware and software settings in a system in which the memory device is embedded, code in the secure blocks, and code in the accessible blocks.

14. The device of claim 9, wherein the operations further comprise:
executing code in the secure blocks using the range of memory addresses in the altered memory map to receive an update to the memory device; and
applying the update to blocks in the memory device.

15. The device of claim 9, wherein the memory comprises an EEPROM, wherein the initialization event comprises a power-on reset, and a memory controller performs the power-on reset operations in response to detecting a power cycle event.

16. The device of claim 9, wherein the range of memory addresses mapping to the secure blocks in the altered memory map includes a boot address, wherein execution of the code in the secure blocks staffs from the boot address.

17. A system, comprising:
a programmable device; and
a non-volatile memory device coupled to the programmable device, comprising:
blocks of cells;
circuitry configured to perform operations, the operations comprising:
detecting an initialization event;
generating an initial memory map in response to the initialization event having a mapping of memory addresses to accessible blocks of cells in the non-volatile memory device that are accessible following a boot sequence, and wherein there are secure blocks of cells in addition to the accessible blocks of cells that are not accessible through the memory addresses in the initial memory map;

mapping a range of memory addresses in the initial memory map to the secure blocks of cells to generate an altered memory map;

executing code in the secure blocks using the range of memory addresses in the altered memory map;

remapping the range of memory addresses mapping to the secure blocks in the altered memory map to map to the accessible blocks to which the range of memory addresses mapped in the initial memory map to restore the initial memory map from the altered memory map; and executing code in the accessible blocks to complete the boot sequence and loading an operating system and applications from the accessible blocks in response to remapping the range of memory addresses.

18. The system of claim 17, wherein the secure blocks are not accessible to any operations after the remapping, and wherein the accessible blocks addressed by the range of memory addresses in the initial memory map are not accessible through the altered memory map during initialization event operations.

19. The system of claim 17, wherein the operations further comprise:

executing code in the secure blocks using the memory addresses in the altered memory map to validate configuration information, wherein the remapping of the range of memory addresses to restore the initial memory map is performed in response to validating the configuration information.

20. The system of claim 19, wherein the configuration information comprises at least one of hardware and software settings in a system in which the memory device is embedded, code in the secure blocks, and code in the accessible blocks.

21. The system of claim 17, wherein the memory device comprises an EEPROM, wherein the initialization event comprises a power-on reset, and a memory controller performs the power-on reset operations in response to detecting a power cycle event.

22. An article of manufacture comprising at least one of a computer readable storage medium and hardware device including code configured to communicate with a memory including an array of blocks of cells and to perform operations, the operations comprising:

detecting an initialization event;

generating an initial memory map in response to the initialization event having a mapping of memory addresses to accessible blocks of cells in the memory that are accessible following a boot sequence, and wherein there are secure blocks of cells in addition to the accessible blocks of cells that are not accessible through the memory addresses in the initial memory map;

mapping a range of memory addresses in the initial memory map to the secure blocks of cells to generate an altered memory map;

executing code in the secure blocks using the range of memory addresses in the altered memory map;

remapping the range of memory addresses mapping to the secure blocks in the altered memory map to map to the accessible blocks to which the range of memory addresses mapped in the initial memory map to restore the initial memory map from the altered memory map; and executing code in the accessible blocks to complete the boot sequence and loading an operating system and applications from the accessible blocks in response to remapping the range of memory addresses.

23. The article of manufacture of claim 22, wherein the secure blocks are not accessible to any operations after the remapping, and wherein the accessible blocks addressed by the range of memory addresses in the initial memory map are not accessible through the altered memory map during initialization event operations.

24. The article of manufacture of claim 22, wherein the operations further comprise:

executing code in the secure blocks using the memory addresses in the altered memory map to validate configuration information, wherein the remapping of the range of memory addresses to restore the initial memory map is performed in response to validating the configuration information.

25. The article of manufacture of claim 22, wherein the operations further comprise:

executing code in the secure blocks using the range of memory addresses in the altered memory map to receive an update to the memory device; and applying the update to blocks in the memory device.

26. The article of manufacture of claim 22, wherein the memory comprises an EEPROM, wherein the initialization event comprises a power-on reset, and wherein the power-on reset operations are performed in response to detecting a power cycle event.

* * * * *

UNITED STATES PATENT AND TRADEMARK OFFICE
CERTIFICATE OF CORRECTION

PATENT NO. : 7,673,129 B2  Page 1 of 1
APPLICATION NO. : 11/237306
DATED : March 2, 2010
INVENTOR(S) : J. C. Rudelic It is certified that error appears in the above-identified patent and that said Letters Patent is hereby corrected as shown below:

In the Claims:

Column 8, Line 52, "blocks staffs from" should read --blocks starts from--.

Signed and Sealed this
Twelfth Day of May, 2015

Michelle K. Lee
*Director of the United States Patent and Trademark Office*